(12) United States Patent
Marom

(10) Patent No.: US 11,394,804 B2
(45) Date of Patent: Jul. 19, 2022

(54) SYSTEM AND METHOD FOR STATELESS DISTRIBUTION OF BIDIRECTIONAL FLOWS WITH NETWORK ADDRESS TRANSLATION

(71) Applicant: RADWARE, LTD., Tel Aviv (IL)

(72) Inventor: Shy Marom, Ramat HaSharon (IL)

(73) Assignee: Radware, Ltd., Tel Aviv (IL)

(*) Notice: Subject to any disclaimer, the term of this patent is extended or adjusted under 35 U.S.C. 154(b) by 861 days.

(21) Appl. No.: 14/870,600

(22) Filed: Sep. 30, 2015

(65) Prior Publication Data

US 2017/0093792 A1    Mar. 30, 2017

(51) Int. Cl.
*H04L 67/01* (2022.01)
*H04L 61/2517* (2022.01)
*H04L 61/255* (2022.01)
*H04L 61/2514* (2022.01)

(52) U.S. Cl.
CPC ............ *H04L 67/42* (2013.01); *H04L 61/255* (2013.01); *H04L 61/2514* (2013.01); *H04L 61/2517* (2013.01)

(58) Field of Classification Search
CPC ............... H04L 61/255; H04L 61/2517; H04L 61/2514; H04L 67/42
See application file for complete search history.

(56) References Cited

U.S. PATENT DOCUMENTS

| | | | |
|---|---|---|---|
| 7,266,604 B1 | 9/2007 | Nathan et al. | |
| 7,584,286 B2* | 9/2009 | Goglin | H04L 12/56 709/223 |
| 8,150,981 B2 | 4/2012 | Goglin et al. | |
| 8,635,352 B2* | 1/2014 | Shemesh | H04L 9/0866 370/352 |
| 8,661,160 B2* | 2/2014 | Mann | H04L 9/3236 709/223 |
| 9,565,103 B1* | 2/2017 | Sidebottom | H04L 45/72 |
| 9,712,460 B1* | 7/2017 | Friend | H04L 47/35 |
| 9,740,541 B2* | 8/2017 | Takada | G06F 9/546 |
| 2004/0049701 A1* | 3/2004 | Le Pennec | H04L 41/042 726/11 |
| 2005/0080923 A1* | 4/2005 | Elzur | H04L 47/10 709/238 |
| 2006/0026094 A1 | 2/2006 | Oral et al. | |

(Continued)

OTHER PUBLICATIONS

"Scalable Networking: Eliminating the Receive Processing Bottleneck—Introducing RSS", WinHEC 2004 Version; Apr. 14, 2004; 2004 Microsoft Corporation.*

(Continued)

*Primary Examiner* — Hitesh Patel
*Assistant Examiner* — Sandarva Khanal
(74) *Attorney, Agent, or Firm* — M&B IP Analysts, LLC

(57) ABSTRACT

A method for stateless distribution of bidirectional flows with network address translation (NAT) comprises: determining an original source port for a first packet of a front-end received from a client device, wherein the original source port is associated with a processing core; selecting a new source port for a back-end flow, wherein the new source port is selected such that the back-end flow is returned to the processing core of the front-end flow; replacing the original source port with the new source port; and transmitting the incoming flow to a destination server.

19 Claims, 4 Drawing Sheets

(56) References Cited

U.S. PATENT DOCUMENTS

| | | | | |
|---|---|---|---|---|
| 2009/0006521 A1* | 1/2009 | Veal | ................ | H04L 45/00 709/201 |
| 2011/0026403 A1* | 2/2011 | Shao | ................ | H04L 67/2895 370/235 |
| 2011/0153861 A1* | 6/2011 | Chauhan | ................ | H04L 69/04 709/232 |
| 2011/0161500 A1* | 6/2011 | Yengalasetti | ................ | H04L 65/608 709/227 |
| 2012/0033680 A1* | 2/2012 | Gopinath | ................ | H04L 49/901 370/412 |
| 2013/0343388 A1* | 12/2013 | Stroud | ................ | H04L 47/00 370/392 |
| 2014/0280825 A1 | 9/2014 | Agrawal et al. | | |
| 2014/0280839 A1 | 9/2014 | Agrawal et al. | | |
| 2015/0019702 A1* | 1/2015 | Kancherla | ................ | H04L 47/125 709/223 |
| 2015/0156271 A1* | 6/2015 | Goel | ................ | H04L 67/1002 709/219 |

OTHER PUBLICATIONS

"Scalable Networking: Eliminating the Receive Processing Bottleneck—Introducing RSS", WinHEC 2004 Version—Apr. 14, 2004, 2004 Microsoft Corporation. (Year: 2004).*

Adam Sawicki, "Bit Tricks with Modulo", Feb. 26, 2011, Retrieved from web URL http://www.asawicki.info/news_1433_bit_tricks_with_modulo.html (Year: 2011).*

Holdsworth et al. "Digital Logic Design", 4th Edition, Publisher: Elsevier Science & Technology, 2002. (Year: 2002).*

John F. Wakerly, "Digital Design: Principles and Practices", 4th Edition, Publisher: Pearson / Prentice Hall, 2005 (Year: 2005).*

Mid Sweden University, Spring 2006, Computer Networks Lecture PowerPoint Slide on Chapter 10—Error Detection and Correction, Slide #20 (Year: 2006).*

Wayne Storr, "Exclusive—OR Gate Tutorial", Updated Sep. 18, 2014, Snapshot dated Sep. 21, 2014 retrieved using WayBack Machine on Jan. 14, 2020 from URL https://web.archive.org/web/20140921043659/http://www.electronics-tutorials.ws/logic/logic_7.html (Year: 2014).*

Woo, et al., "Scalable TCP Session Monitoring with Symmetric Receive-side Scaling", Kaist Technical Report, 2012.

* cited by examiner

SYSTEM AND METHOD FOR STATELESS DISTRIBUTION OF BIDIRECTIONAL FLOWS WITH NETWORK ADDRESS TRANSLATION

TECHNICAL FIELD

The disclosure generally relates to packet-processing, and more particularly to a system which performs network address translation such that directional flows land on the same packet-processing thread.

BACKGROUND

Various packet-processing devices use distributed software architecture to ensure parallelization of packet flow handling. Such distributed software architecture typically includes multiple central processing units (CPUs). Typically, each CPU consisting of multiple processing cores is utilized to run a separate packet-processing thread in each of the available cores. This separation between threads effectively "breaks" the packet-processing task into several smaller tasks. It is desirable to have these threads as independent as possible, to limit the amount of communication between the threads, and to minimize reliance on shared data because the efficiency of such systems is inversely related to the degree of interdependency and/or sharing among threads.

To distribute the packets between the packet-processing threads (and, therefore, between the CPU's cores), many current distributed software architectures use a feature known as Receive-Side Scaling (RSS). RSS was defined by Microsoft® and is implemented by network interface cards (NICs). A device that implements the RSS performs a hardware hash on IP addresses (and, optionally, TCP/UDP port numbers) of incoming packets. Then, based on the hash result, the device delivers the packet to a predefined receive-queue belonging to a group of receive-queues. Each such receive-queue is mapped to a specific processing core such that the RSS can persistently deliver packets of the same directional flow (e.g., from an IP address A to an IP address B) to the same processing core and, therefore, to the same packet-processing thread.

A problem with RSS is that the hash function being used such as, e.g., a Toeplitz hash, is asymmetric. In this case, a packet from host (address) A sent to host B will have an RSS result:

$$X = RSS(IP_A, IP_B, SPort, DPort) \quad \text{Equation 1}$$

In contrast, the packet returning from B to A, where the source and destination addresses and ports are exchanged, has a different RSS result:

$$Y = RSS(IP_B, IP_A, DPort, SPort) \quad \text{Equation 2}$$

The end result is that the forward direction of the packet flow ends at a particular packet-processing core, while the return direction flow will most likely end at a different packet-processing core. This asymmetry is particularly problematic for high-performance transmission control protocol (TCP) systems, which must monitor packet flows in both directions to ensure reliability of packet transfers.

A straightforward software solution for such issues is to share the packet and session state data-structures among the packet-processing cores. This immediately leads to performance degradation as mentioned above. Moreover, when non-uniform memory access (NUMA) is utilized, packets may be mapped to RAM that is far from the handling CPU socket. Such mapping creates imbalance in the system, thereby causing considerable variation in packet treatment time.

Another solution is to force the RSS to be symmetric. Existing methods of forcing the RSS to be symmetric include setting specific initialization values to the NIC, such that RSS hash values are the same for packets flowing in both the forward and return directions. However, such methods are not effective while performing Network Address Translation (NAT), in which one IP address space is remapped by modifying network address information in packet headers during transit.

Symmetric RSS is not effective when the network device performs NAT because the directional flows utilize different IP addresses. As an example, a front-end flow from client "C" to a virtual IP address "V" results in an RSS computation of:

$$X = RSS(IP_C, IP_V, SPort, DPort) \quad \text{Equation 3}$$

Upon sending the packet to the selected server, a load balancing function changes the destination IP address to that of the selected server "S". When the selected server responds, the returning packets are sent from its own IP address to that of the client, resulting in an RSS computation of:

$$Y = RSS(IP_S, IP_C, DPort, SPort) \quad \text{Equation 4}$$

The end result is that the forward direction of the packet flow ends at a specific packet-processing core, while the return direction flow likely reaches a different packet-processing core. As a result, forcing RSS symmetry during NAT is ineffective.

Thus, at best, the symmetric RSS may be a feasible solution for network devices that are transparent, at least at the IP level. Examples for such devices include software-based routers, DPI engines, and firewalls. However, when the network function performs NAT, symmetric RSS can no longer help. Examples for such devices are ADCs.

For an ADC, the network is logically split between the front-end, where it exposes virtual addresses, and the back-end, where the actual servers reside. Clients send packets to a virtual address (VIP), the ADC determines the server that should handle these packets and forwards them to that server. To be able to transmit the packet to the server, the ADC must change the destination address of the packet from the VIP to the actual server IP. Thus, the ADC performs NAT whenever it sends packets to a destination server.

As demonstrated by Equations 3 and 4 above, the symmetric RSS cannot be utilized by ADCs because a fundamental portion of the input to the RSS computation is completely different between the front-end and back-end flows.

Another challenge with performing RSS in ADCs is that the destination port on the front-end may be different from the actual port that the servers are listening on.

Therefore, it would be advantageous to provide a solution for performing NAT while ensuring that directional flows in both directions are processed by the same packet-processing thread.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for stateless distribution of bidirectional flows with network address translation (NAT). The method comprises: determining an original source port for a first packet of a front-end flow received from a client device, wherein the original source port is associated with a processing core; selecting a new source port for a back-end flow, wherein the new source port is selected such that the back-end flow is returned to the processing core of the front-end flow; replacing the original source port with the new source port; and transmitting the incoming flow to a destination server.

Certain embodiments disclosed herein also include a system for stateless distribution of bidirectional flows with network address translation (NAT). The system comprises a processing unit; and a memory, the memory containing instructions that, when executed by the processing unit, configure the system to: determine an original source port for a first packet of a front-end flow received from a client device, wherein the original source port is associated with a processing core; select a new source port for a back-end flow, wherein the new source port is selected such that the back-end flow is returned to the processing core of the front-end flow; replace the original source port with the new source port; and transmit the incoming flow to a destination server.

BRIEF DESCRIPTION OF THE DRAWINGS

The subject matter that disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
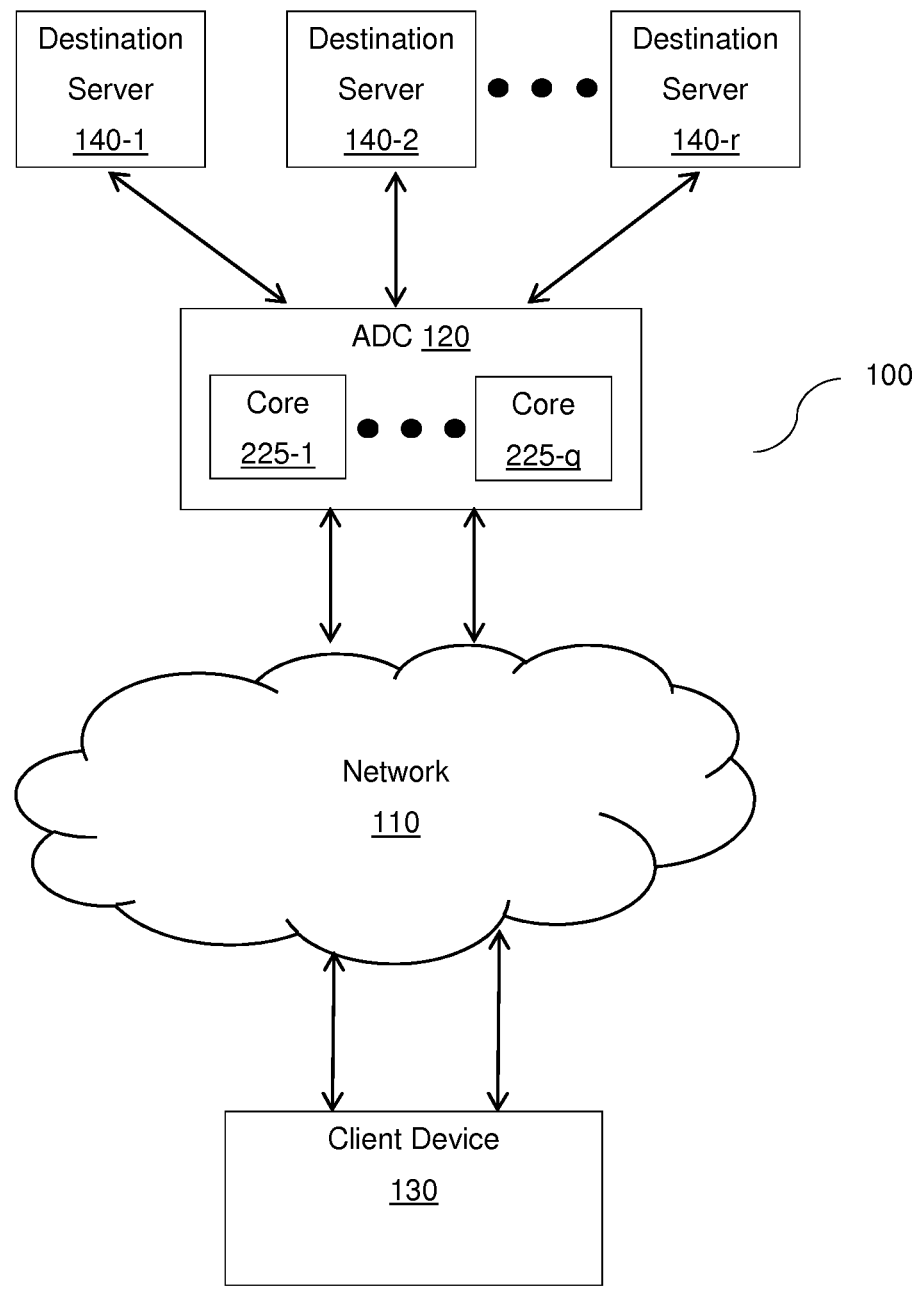
FIG. 1 is a network diagram utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an exemplary and non-limiting network diagram 100 used to describe various disclosed embodiments. A network 110 is communicatively connected to an application delivery controller (ADC) 120 and a client device 130. It should be noted that a single ADC 120 and a single client device 130 are shown merely for the sake of simplicity and without limitation on the disclosed embodiments. Additional ADCs and/or client devices may be communicatively connected to the network 110 without departing from the scope of the disclosed embodiments.

The ADC 120 further includes a plurality of processing cores 225-1 through 225-$q$ (hereinafter referred to individually as a processing core 225 and collectively as processing cores 225). It should be noted that the ADC 120 may be a physical ADC, a plurality of physical ADCs, a virtualized ADC, or any other device capable of performing NAT functions. A virtualized ADC is a physical computing device that can execute a plurality of instances of virtual ADCs (vADCs).

The ADC 120 is further communicatively connected to destination servers 140-1 through 140-$r$ (hereinafter referred to individually as a destination server 140 and collectively as destination servers 140).

The ADC 120 is configured to distribute incoming traffic from the client device 130 to one of the destination servers 140. In an optimal operation, a traffic flow packet from the client device 130 is distributed to one of the processing cores 225 such that the same traffic flow is processed by the same core 225.

To this end, the ADC 120 is configured to assign an original source port to the client device 130 during a front-end flow of the packet to one of the destination servers 140. The ADC 120 is further configured to determine a new source port for the back-end flow from a destination server 140 to the client device 130, replacing the client device 130's original source port. The new source port is determined such that the same processing core 225 is utilized for both the front-end and back-end flows. Selection of source ports and traffic distribution in the ADC 120 is described further herein below with respect to FIG. 2. It should be noted that the new source port may be determined without consideration of any packet buffer, and may be completely stateless. It should be noted that the disclosed embodiments may be utilized in conjunction with any kind of NAT being performed on the back-end flow. For example, the disclosed embodiments may be performed in conjunction with, but not limited to, static NAT, dynamic NAT, port address translation, and any other NAT function. The NAT operation can be applied on any network parameter or address. It should be noted that the original source port refers to a port number. Further, the source port may be any of: a transmission control protocol (TCP) port, and a user datagram protocol (UDP) port.

Figure 2:
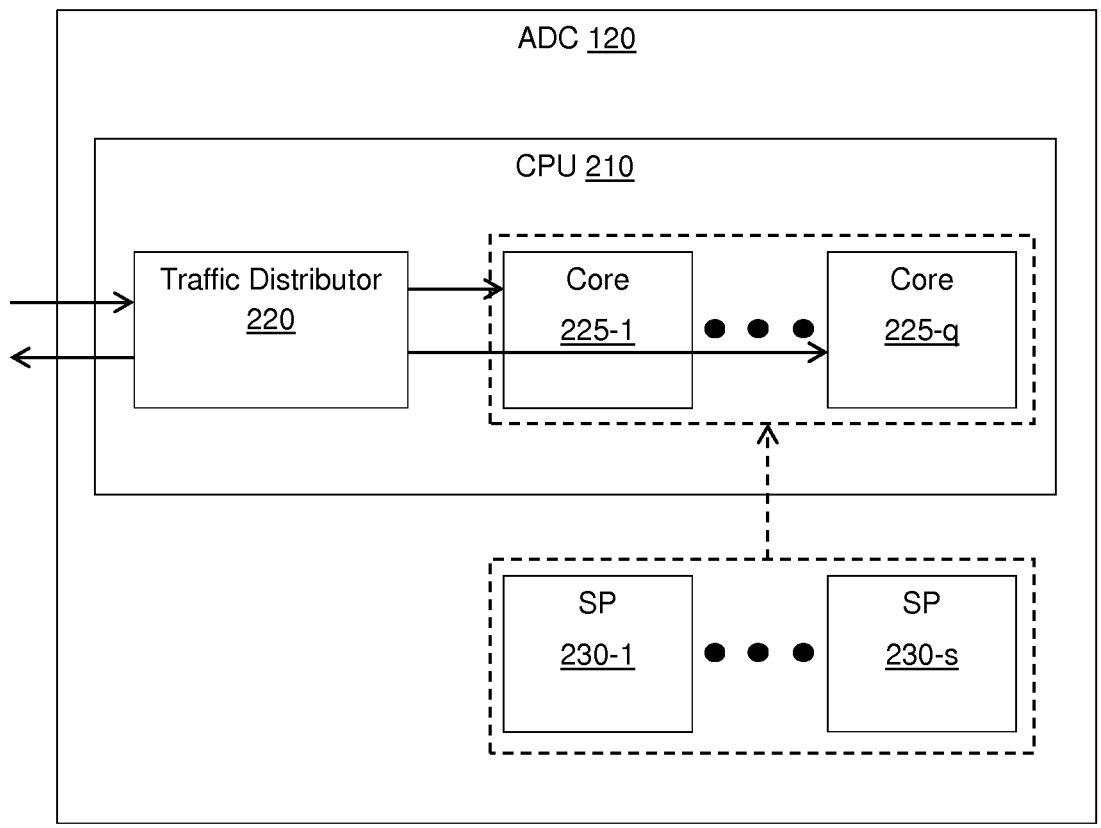
FIG. 2 is a schematic diagram illustrating an application delivery controller according to an embodiment.

FIG. 2 is an exemplary and non-limiting schematic block diagram of an ADC 120 utilized to describe the disclosed embodiments.

In this embodiment, the ADC 120 includes a CPU 210. It should be noted that additional CPUs may be included in the ADC 120 without departing from the scope of the disclosed embodiments. The CPU 210 is connected to a traffic distributor 220 communicatively connected to the plurality of processing cores 225. The traffic distributor 220 can be implemented in software, hardware, firmware or any combination thereof. The ADC maintains a plurality of source ports 230-1 through 230-$s$ (hereinafter referred to individually as a source port 230 and collectively as source ports 230). Each source port 230 is a number assigned to the client device 130 during packet delivery and is used during NAT.

In an exemplary and non-limiting embodiment, the traffic distributor 220 is configured to schedule the execution of the ADC 120 on the processing cores 225. In particular, the traffic distributor 220 is configured to select which processing core 225 to use among the processing cores 225 based on, e.g., layer 3 and/or layer 4 (TCP/IP) parameters of an Open Systems Intercommunication (OSI) model of the ADC 120.

The traffic distributor 220 directs an incoming packet to selected processing core 225. According to the disclosed embodiments, each selected processing core 225 is configured to perform NAT between an IP address and/or port number of the front-end flow and an IP address and/or port number of the back-end flow. Upon receiving a packet, a selected processing core 225 is configured to assign a source port to the client device 130. As noted above, the disclosed techniques ensure that the bidirectional flow is always processed by the same core 225.

Specifically, to deliver packets to the appropriate destination (e.g., a queue that is mapped to a processing core 225), the traffic distributor 220 and/or ADC 120 are configured to process only a few bits of the RSS result. For example, if the ADC includes 8 processing cores 225 (i.e. there are 8 packet-processing threads) and the RSS result is a 32 bit integer, the ADC 120 is configured to process just 3 bits of the RSS. In that example, the desired outcome is an RSS result in which just 3 bits match for both flow directions. In an embodiment, these bits are the LSBs.

Generalizing the above discussion, for an ADC including "m" processing cores 225, the least number of bits "n" required to determine the appropriate processing core 225 is:

$$n=\log2(m),\qquad\text{Equation 5}$$

where m>1. When the first packet of a flow is received, the traffic distributor 220 is configured to examine n bits from the RSS result and to deliver the first packet to one of the processing cores, such as processing core 225-4. The processing core 225-4 is then configured to determine which destination server 140 to send the packet to. The processing core 225-4 is further configured to select a new source port for the back-end flow, replacing the client's original source port. The new source port is selected such that the modulo result of the original RSS result is equal to or higher than the modulo result of the new RSS result. As a result, the same processing core 225-4 is utilized for both the front-end and back-end flows.

As an example, where the RSS result for the front-end flow is:

$$X=\text{RSS}(\text{IPC, IPV, SPort, DPort})\qquad\text{Equation 6}$$

the RSS result for the back-end flow would be:

$$Y=\text{RSS}(\text{IPS, IPC, DPort, APort})\qquad\text{Equation 7}$$

where "APort" is one of the source ports 230 and is selected such that:

$$\text{mod}(X, n)=\text{mod}(Y,n)\qquad\text{Equation 8}$$

where "mod(X, n)" "mod(Y, n)" are the modulo operations on RSS hash value where "n" is the least number of bits required to determine the appropriate processing. The value of "n" can be computed using Equation 5. The result is that a source port 230 is selected such that the same processing core 225-4 is utilized for both the front-end and back-end flows.

It should be noted that in certain implementation the ADC 120 does not include a software traffic distributor. The selection of the processing core 225 to receive an incoming flow may be based on a hardware based traffic distributor that may be implemented in a network interface card, network processor, switch etc.

It should be further noted that the CPU 210 may be realized as a processing system. The processing system may comprise or be a component of a larger processing system implemented with one or more processing cores (or processors). The processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 3:
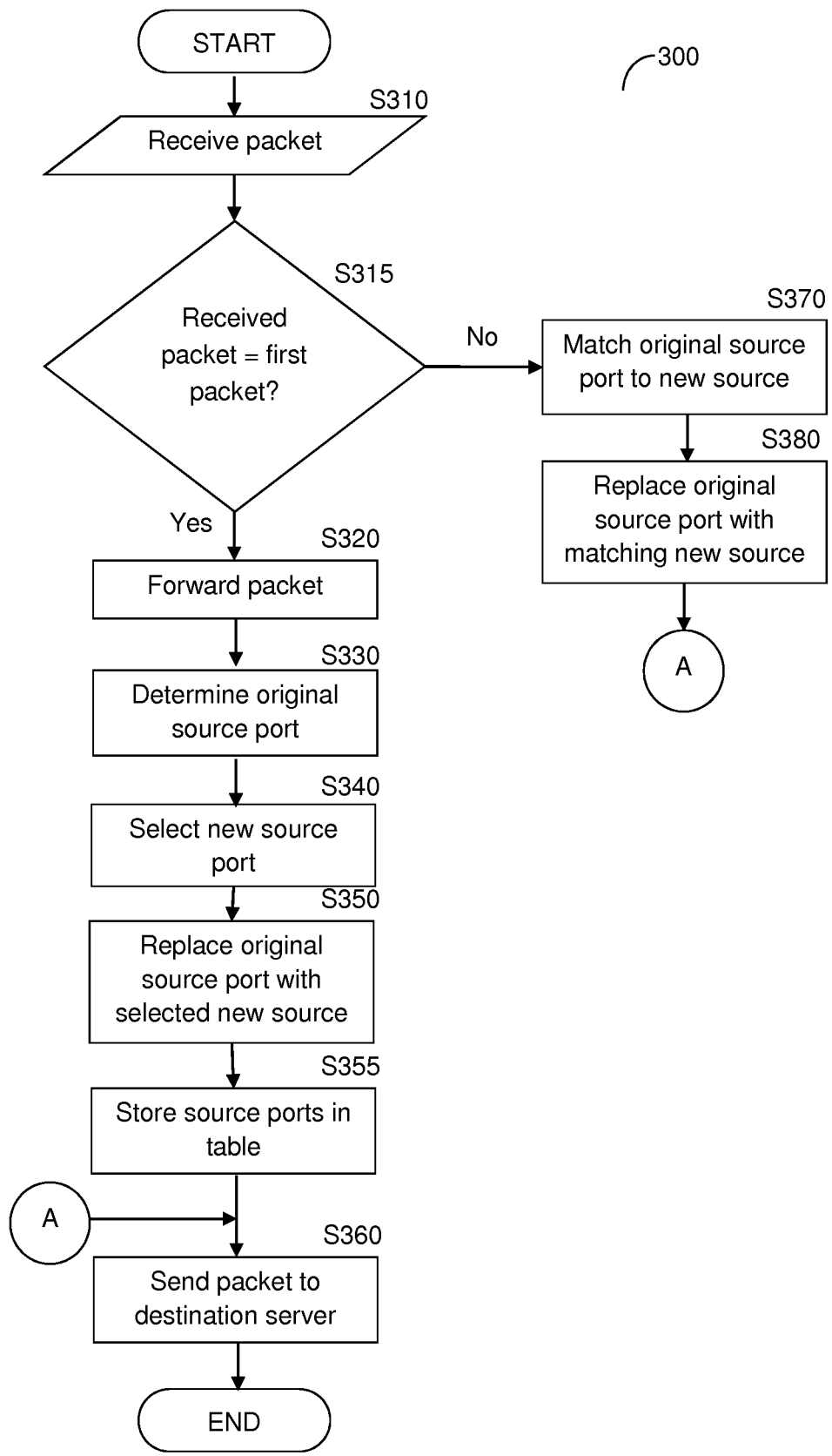
FIG. 3 is a flowchart illustrating a method for establishing stateless front-end flow distribution during NAT according to an embodiment.

FIG. 3 is an exemplary and non-limiting flowchart 300 illustrating establishing stateless front-end flow distribution during NAT according to an embodiment. In an embodiment, the method can be performed by any processing core (e.g., the cores 225), wherein the processing core is selected based on, for example, a distribution scheme. In a non-limiting embodiment, such a distribution scheme can be implemented by a traffic distributor (e.g., the traffic distributor 220). The method discussed in FIG. 3 relates to front-end packet handling, i.e., packets being sent from a client to a destination server.

In S310, at least one packet of a traffic flow is received from a client device (e.g., the client device 130). In S315, it is checked if the received packet is the first packet of the flow and, if so, execution continues with S320; otherwise, execution continues with S370, wherein subsequent packets belonging to a flow that has already been processed by a designated processing core are handled according to information stored in a memory of the ADC (not shown) during the flow first packet handling. It should be noted that all subsequent packets belonging to the same flow will be received by the same CPU core. In an embodiment, the determination of whether the packet is the first in the flow is based on a local session table.

In S320, the first packet is handed to the selected processing core (e.g., the processing core 225-3).

In S330, an original source port (e.g., the source port 230-2) of the client device is determined. Such information is typically included in the received traffic flow. The original source port, along with other identifying properties such as IP addresses, are associated with the selected processing core, i.e., the processing core to send the received flow to.

In S340, a new source port is selected for the client device. The new source port is selected such that the "n" least significant bits of the RSS result for the back-end flow will be identical to the "n" least significant bits of the RSS result of the front-end flow. As an example, where the RSS result for the front-end flow is:

$$X=\text{RSS}(\text{IPC, IPV, SPort, DPort});\qquad\text{Equation 9}$$

the RSS result for the back-end flow would be:

$$Y=\text{RSS}(\text{IPS, IPC, DPort, APort});\qquad\text{Equation 10}$$

where new source port "APort" is selected such that Equation 8 is satisfied. Upon selecting the new source port, the processing core utilized for the front-end flow may also be determined and utilized for the back-end flow.

In S350, the client's original source port is replaced with the selected new source port. In S355, the client's original source port and the respective selected source port are saved in a local session table. The local session table includes at least an original client source port and the respective selected new source. The table may further include, but is not limited to, the client IP address, a virtual IP (VIP) address of the ADC, the client's destination port numbers, a selected destination server IP address, and so on. Each entry in the local session table is a different session.

In S360, the received packet is sent to the destination server with the new source port. This ensures that the back-end flow will be returned to the originally selected processing core for processing and delivery to the client device.

In S370, upon determining that the received packet is not the first packet of the flow, at least the (original) client source port is matched against the local session table to find a matching entry. This matching is performed in order to retrieve the new source port selected for the flow. In S380, at least the client's original source port is replaced with the retrieved new source port. Then, execution continues with S360 and execution terminates for the packet.

Figure 4:
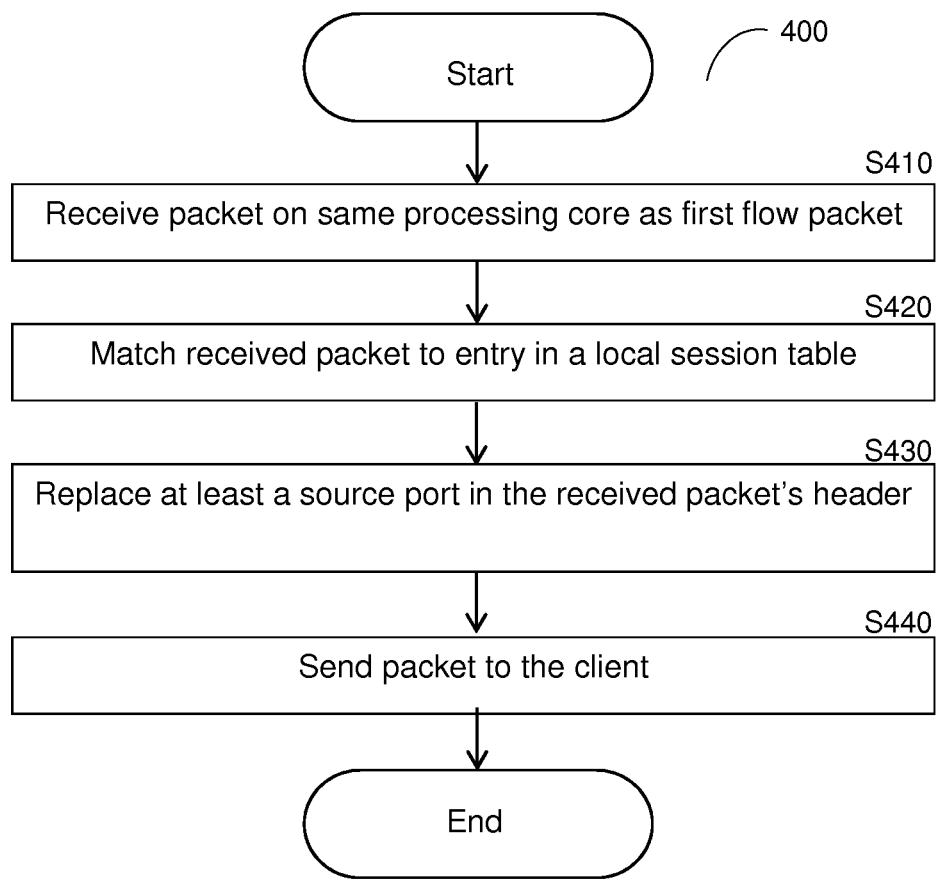
FIG. 4 is a flowchart illustrating a method for establishing stateless back-end flow distribution during NAT according to an embodiment.

FIG. 4 is an exemplary and non-limiting flowchart 400 illustrating establishing stateless back-end flow distribution during NAT according to an embodiment. The back-end packet handling relates to packets being sent from the destination server to a client. In an embodiment, the method is performed by a processing core that handled a first incoming packet of the flow (i.e., the processing selected in S320, FIG. 3).

In S410, a packet from the destination server is received at a processing core that handled incoming packet(s) of the same flow. That is, such a packet is received by the same processing core selected to handle the first packet of the same flow. In S420, at least the source port designated in the received packet is matched against the local session table to find a matching entry. The source port is the selected new source port included in the received packet. This is performed in order to retrieve the corresponding original source port of the client. In S430, at least the currently designated source port is replaced with the retrieved client's original source port. In S440, the packet including the replaced source port designation is sent to the client.

It should be noted that, combined, the processes described herein above with respect to FIGS. 3 and 4 provide bidirectional flow distribution during NAT and ensure that packets received from a client and packets sent from a destination server of the same flow are processed by the same processing core of an ADC or any NAT device. The separation for front-end and back-end processing is merely for the simplicity of the discussion and does not limit any of the various disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure. Furthermore, the foregoing detailed description has set forth a few of the many forms that the disclosed embodiments can take. It is intended that the foregoing detailed description be understood as an illustration of selected forms that the disclosure can take and not as a limitation to the definition of the disclosed embodiments.

What is claimed is:

1. A method for stateless distribution of bidirectional flows with network address translation (NAT), comprising:
    determining an original source port for a first packet of a front-end flow received from a client device, wherein the original source port is associated with a processing core;
    selecting a new source port for a back-end flow, wherein the new source port is selected such that the back-end flow is returned to the processing core of the front-end flow;
    replacing the original source port with the new source port; and
    transmitting the back-end flow with the new source port to a destination server;
    wherein selecting the new source port further comprises:
    selecting a port number ensuring that a first number of least significant bits of a receive-side scaling (RSS) result for the front-end flow is identical to a second number of least significant bits of a RSS result for the back-end flow;
    wherein there are more than two processing cores, and
    wherein a port number ensures that the first number of least significant bits of a receive-side scaling (RSS) result for the front-end flow is identical to the second number of least significant bits of a RSS result for the back-end flow when a result of applying a modulo operation between the RSS result for the front-end flow and the first number is equal to a result of applying a modulo operation between the RSS result for the back-end flow and the second number.

2. The method of claim 1, wherein the processing core is one of a plurality of processing cores.

3. The method of claim 1, wherein each of the first and the second number of least significant bits of the RSS results is equal to or higher than the logarithm of the number of processing cores in the plurality of processing cores to base 2.

4. The method of claim 1, further comprising:
selecting the processing core based on at least one of: layer 3 parameters of an Open Systems Intercommunication (OSI) model, and layer 4 parameters of an OSI model.

5. The method of claim 1, wherein transmitting the back-end flow to the destination server further comprises:
performing a network address translation (NAT) on at least one of: a source internet protocol (IP) address, a destination IP address, a source port number, and a destination port number.

6. The method of claim 5, wherein the NAT is any of: static NAT, dynamic NAT, and port address translation.

7. The method of claim 1, further comprising:
saving the new source port and the corresponding original source port locally in a session table format.

8. The method of claim 7, further comprising:
receiving, by the processing core, a subsequent packet belonging to the flow of the first packet;
looking up the new selected source port matching a source port designated in the subsequent packet;
replacing the source port designated in the subsequent packet with the new source port; and
sending the subsequent packet to the destination server.

9. The method of claim 7, further comprising:
receiving, by the processing core, a packet from the destination server, wherein the packet belongs to the flow of the first packet;
looking up the original source port matching the new selected source port designated in the received packet;
replacing the new selected source port designated in the received packet with the original source port; and
sending the subsequent packet to the client device.

10. A non-transitory computer readable medium having stored thereon instructions for causing one or more processing units to execute the method according to claim 1.

11. A system for stateless distribution of bidirectional flows with network address translation, comprising:
a processing unit; and
a memory, the memory containing instructions that, when executed by the processing unit, configure the system to:
determine an original source port for a first packet of a front-end flow received from a client device, wherein the original source port is associated with a processing core;
select a new source port for a back-end flow, wherein the new source port is selected such that the back-end flow is returned to the processing core of the front-end flow;
replace the original source port with the new source port; and
transmit the back-end flow with the new source port to a destination server;
wherein the new source port selected has a port number that is a number ensuring that a first number of least significant bits of a receive-side scaling (RSS) result for the front-end flow is identical to a second number of least significant bits of a RSS result for the back-end flow;
wherein there are more than two processing cores, and
wherein a port number ensures that the first number of least significant bits of a receive-side scaling (RSS) result for the front-end flow is identical to the second number of least significant bits of a RSS result for the back-end flow when a result of applying a modulo operation between the RSS result for the front-end flow and the first number is equal to a result of applying a modulo operation between the RSS result for the back-end flow and the second number.

12. The system of claim 11, wherein the processing core is one of a plurality of processing cores.

13. The system of claim 11, wherein each of the first and the second number of least significant bits of the RSS results is equal to or higher than the logarithm of the number of processing cores in the plurality of processing cores to base 2.

14. The system of claim 11, wherein the system is further configured to:
select the processing core based on at least one of: layer 3 parameters of an Open Systems Intercommunication (OSI) model, and layer 4 parameters of an OSI model.

15. The system of claim 11, wherein the system is further configured to:
perform a network address translation (NAT) on at least one of: a source internet protocol (IP) address, a destination IP address, a source port number, and a destination port number.

16. The system of claim 15, wherein the NAT is any of: static NAT, dynamic NAT, and port address translation.

17. The system of claim 11, wherein the system is further configured to:
save the new source port and the corresponding original source port locally in a session table format.

18. The system of claim 17, wherein the system is further configured to:
receive, by the processing core, a subsequent packet belonging to the flow of the first packet;
look up the new selected source port matching a source port designated in the subsequent packet;
replace the source port designated in the subsequent packet with the new source port; and
send the subsequent packet to the destination server.

19. The system of claim 17, wherein the system is further configured to:
receive, by the processing core, a packet from the destination server, wherein the packet belongs to the flow of the first packet;
look up the original source port matching the new selected source port designated in the received packet;
replace the new selected source port designated in the received packet with the original source port; and
send the subsequent packet to the client device.

* * * * *